(12) United States Patent
Abe et al.

(10) Patent No.: US 8,158,283 B2
(45) Date of Patent: Apr. 17, 2012

(54) LITHIUM/NICKEL COMPOSITE OXIDE POSITIVE ELECTRODE ACTIVE MATERIAL FOR NON-AQUEOUS ELECTROLYTE-BASED SECONDARY BATTERY AND BATTERY USING THE SAME

(75) Inventors: Isao Abe, Niihama (JP); Satoshi Matsumoto, Niihama (JP); Shuji Tsutsumi, Nara (JP); Takashi Takeuchi, Osaka (JP)

(73) Assignees: Sumitomo Metal Mining Co., Ltd., Tokyo (JP); Panasonic Corporation, Osaka (JP)

( * ) Notice: Subject to any disclaimer, the term of this patent is extended or adjusted under 35 U.S.C. 154(b) by 811 days.

(21) Appl. No.: 11/727,410

(22) Filed: Mar. 26, 2007

(65) Prior Publication Data
US 2007/0231694 A1      Oct. 4, 2007

(30) Foreign Application Priority Data
Mar. 30, 2006   (JP) ................................. 2006-093659

(51) Int. Cl.
*H01M 4/52*   (2010.01)

(52) U.S. Cl. ..................... 429/231.3; 429/223; 429/224; 429/231.1; 429/231.9; 429/231.95

(58) Field of Classification Search ........................ None
See application file for complete search history.

(56) References Cited

U.S. PATENT DOCUMENTS
2004/0161668 A1*   8/2004   Maeda et al. .............. 429/231.3

FOREIGN PATENT DOCUMENTS

| JP | 9-231963 | 9/1997 |
|---|---|---|
| JP | 9-259879 | 10/1997 |
| JP | 11-135123 | 5/1999 |
| JP | 3244314 | 10/2001 |
| JP | 2003-17054 | 1/2003 |
| JP | 2003-017054 | * 1/2003 |

* cited by examiner

*Primary Examiner* — Ula C Ruddock
*Assistant Examiner* — Tony Chuo
(74) *Attorney, Agent, or Firm* — Edwards Wildman Palmer LLP; James E. Armstrong, IV; Nicholas J. DiCeglie, Jr.

(57) ABSTRACT

The present invention provides a positive electrode active material for a non-aqueous electrolyte-based secondary battery, composed of a lithium/nickel composite oxide with high capacity, low cost and excellent heat stability, and a high safety non-aqueous electrolyte-based secondary battery. A positive electrode active material, comprising lithium/nickel composite oxide powders obtained by water washing fired powders having the following composition formula (1), followed by filtering and drying:

$$LiNi_{1-a}M_aO_2 \tag{1}$$

(wherein, M represents at least one kind of an element selected from transition metal elements other than Ni, group 2 elements, or group 13 elements; and "a" satisfies $0.01 \leq a \leq 0.5$), characterized in that specific surface area of the lithium/nickel composite oxide powders after water washing is 0.3 to 2.0 m²/g.

7 Claims, 1 Drawing Sheet

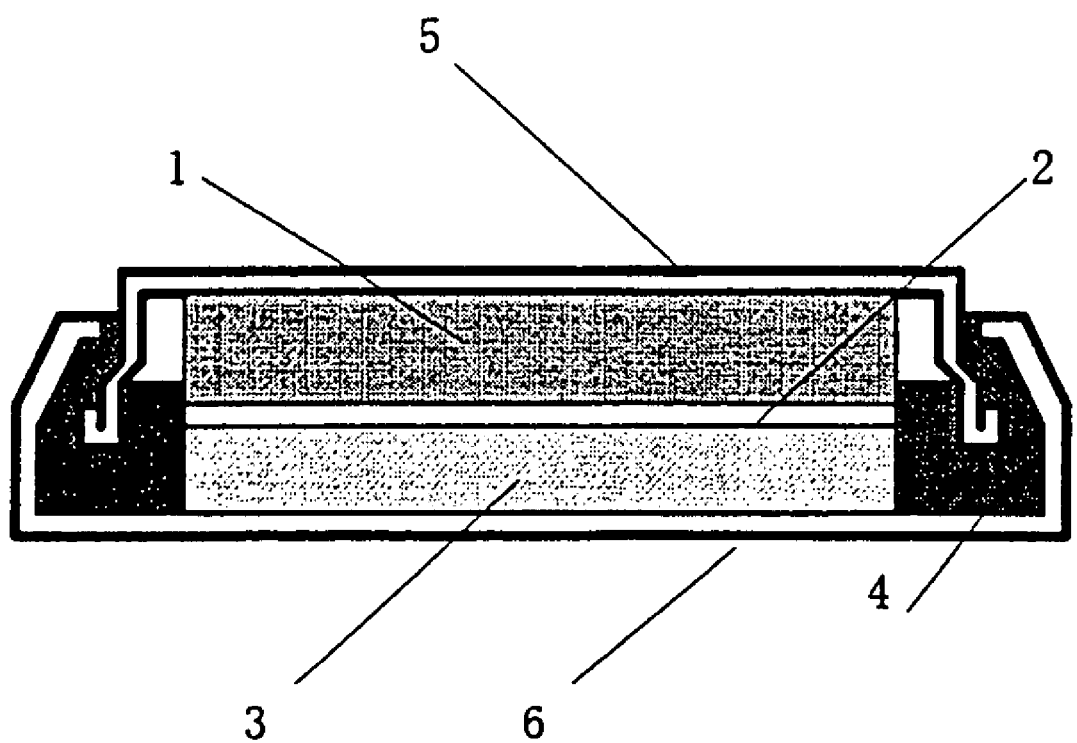

LITHIUM/NICKEL COMPOSITE OXIDE POSITIVE ELECTRODE ACTIVE MATERIAL FOR NON-AQUEOUS ELECTROLYTE-BASED SECONDARY BATTERY AND BATTERY USING THE SAME

BACKGROUND OF THE INVENTION

1. Field of the Invention

The present invention relates to a positive electrode active material for a non-aqueous electrolyte-based secondary battery and a non-aqueous electrolyte-based secondary battery using the same, and more specifically relates to a positive electrode active material for a non-aqueous electrolyte-based secondary battery, composed of a lithium/nickel composite oxide with high capacity, low cost and excellent heat stability, and a non-aqueous electrolyte-based secondary battery, having high capacity and high safety, using the same.

2. Description of the Prior Art

Recently, with rapid expansion of a compact sized electronics device such as a mobile phone and a notebook-type personal computer, demand of a non-aqueous electrolyte-based secondary battery has rapidly growing, as a power source which is capable of charging and discharging. As a positive electrode active material for a non-aqueous electrolyte-based secondary battery, in addition to a lithium/cobalt composite oxide represented by lithium cobaltate ($LiCoO_2$), a lithium/nickel composite oxide represented by lithium nickelate ($LiNiO_2$), a lithium/manganese composite oxide represented by lithium manganate ($LiMnO_2$) and the like are also widely used.

Note that lithium cobaltate had a problem of containing cobalt, as a main component, which is expensive due to scarce amount of reserves, and thus unstable in supply and also large cost fluctuation. Therefore, a lithium/nickel composite oxide or a lithium/manganese composite oxide is noticed in view of cost, because of having relatively low cost nickel or manganese, as a main component. Lithium manganate, however, has many practical problems as a battery, because capacity is very small as compared with other material, and charge and discharge cycle characteristics showing a life time, is also very short, although having excellent heat stability as compared with lithium cobaltate. On the other hand, lithium nickelate is expected as a positive electrode active material which is capable of producing a battery with high energy density in low cost, due to showing larger capacity than lithium cobaltate.

Lithium nickelate, however, had a defect of poor heat stability in charged state than lithium cobaltate, in any of the following powder shapes; lithium nickelate is usually produced by mixing a lithium compound and a nickel compound such as nickel hydroxide or nickel oxyhydroxide, and the firing, and has a powder shape of primary particles with single dispersion, or powder shape of secondary particles having voids, which is an aggregation of primary particles. Namely, pure lithium nickelate had problems of safety like heat stability and the like, charge and discharge cycle characteristics and the like, which had inhibited use as a practical battery; this is because of lower stability of crystal structure in charged state as compared with lithium cobaltate.

As a solution, it is general to obtain a lithium/nickel composite oxide which has good safety, and charge and discharge cycle characteristics, as a positive electrode active material, by substitution of a part of nickel with a transition metal element such as cobalt, manganese and iron, or a heterogeneous element such as aluminum, vanadium and tin, to stabilize crystal structure in a state of lithium being eliminated by charging (see "High density lithium secondary battery", Technosystem Inc., Mar. 14, 1998, pages 61 to 78 or JP-B-3244314 (p. 1 and p. 2)). In this connection, however, small amount of the element substitution cannot attain sufficient improvement of heat stability, while much amount the element substitution causes capacity reduction, and thus superiority as material of a lithium/nickel composite oxide could not be well utilized in a battery.

In addition, to reduce reactivity of an electrolysis solution with a positive electrode active material in a battery, a method for enhancing heat stability by reducing specific surface area of a positive electrode active material, which area is used as an index to reduce reaction surface area thereof, has been proposed (see, for example, JP-A-11-135123 (p. 1 and p. 2)). This method, however, only found out that simultaneous introduction of a small amount of aluminum and yttrium to a lithium composite oxide improves heat stability and reduces specific surface area of the lithium composite oxide, and thus suppresses reactivity between positive electrode material and an electrolysis solution, in overcharge; here, because specific surface area in an adhered state of impurities or by-products at the particle surface of a positive electrode active material is noticed as for reaction surface area of a positive electrode active material with the electrolysis solution, specific surface area used here does not represent true reaction surface area.

Note that, as a modification method for a positive electrode active material, a method for removing impurities or by-products adhered at the positive electrode active material, by water washing has been proposed (see, for example, JP-A-9-231963 (p. 1 and p. 2), JP-A-9-259879 (p. 1 and p. 2) or JP-A-2003-17054 (p. 1 and p. 2)).

Washing of a lithium/nickel composite oxide randomly with water, however, generated the following defects. First of all, proposals of JP-A-9-231963 (p. 1 and p. 2), JP-A-9-259879 (p. 1 and p. 2) or JP-A-2003-17054 (p. 1 and p. 2) aim at improvement of charge and discharge cycle characteristics, stabilization of electrode property and gas generation in charging, and thus do not notice reaction surface area between a positive electrode active material itself and an electrolysis solution. Therefore, there is no description on the effect of change in specific surface area of powders after water washing, and improvement of heat stability. In addition, the washing technology with water had a problem of much amount of elution of lithium ions, or generation of structure change caused by high temperature, namely change in a substance itself, in the limited case of a lithium/nickel composite oxide, because of low slurry concentration or carrying out heat processing at high temperature after water washing.

Namely, a lithium/nickel composite oxide obtainable by a usual production method is a substance which is more difficult to reduce specific surface area by a method providing industrially high productivity while maintaining good electrochemical characteristics, compared with a lithium/cobalt composite oxide. Furthermore, even when specific surface area of the lithium/nickel composite oxide obtained after firing could be reduced, a problem of practically not improving heat stability of the positive electrode active material frequently occurred. Namely, in the case where specific surface area after firing is used as an index, which has conventionally been used as an index of reaction surface area, a lithium/nickel composite oxide with high heat stability could not industrially be produced in a stable manner.

From the above situation, further technical improvement such as improvement method for heat stability and new index thereof or the like has been required, by obtaining a positive electrode active material for a non-aqueous electrolyte-based secondary battery from a lithium/nickel composite oxide having high capacity, low cost and excellent heat stability, and so as to attain a low cost battery with high energy density, using the same.

SUMMARY OF THE INVENTION

In view of these conventional technical problems, it is an object of the present invention to provide a positive electrode active material for a non-aqueous electrolyte-based secondary battery, composed of a lithium/nickel composite oxide with high capacity, low cost and excellent heat stability, and a non-aqueous electrolyte-based secondary battery, having high capacity and high safety.

The present inventors have intensively studied a way to attain the above objectives, on a positive electrode active material for a non-aqueous electrolyte-based secondary battery, composed of a lithium/nickel composite oxide, and found that by subjecting fired powders represented by a specific composition formula to water washing processing under suitable condition, true reaction surface area can be clarified; and heat stability is improved when specific surface area of powders, obtained by subjecting fired powders to water washing processing under specified condition, has specified numerical value or lower, regardless of a lithium/nickel composite oxide generally having low water resistance; and also this specific surface area is suitable as a new index of heat stability; and thus completed the present invention.

Namely, according to a first aspect of the present invention, a positive electrode active material for a non-aqueous electrolyte-based secondary battery, consisting of lithium/nickel composite oxide powders obtainable by water washing fired powders having the following composition formula (1), followed by filtering and drying:

$$LiNi_{1-a}M_aO_2 \quad (1)$$

(wherein, M represents at least one kind of an element selected from transition metal elements other than Ni, group 2 elements, or group 13 elements; and "a" satisfies $0.01 \leq a \leq 0.5$), characterized in that specific surface area of the lithium/nickel composite oxide powders after water washing is 0.3 to 2.0 m$^2$/g is provided.

In addition, according to a second aspect of the present invention, the positive electrode active material for a non-aqueous electrolyte-based secondary battery in the first aspect of the present invention, characterized in that water content of the lithium/nickel composite oxide powders is equal to or less than 0.2% by mass is provided.

In addition, according to a third aspect of the present invention, the positive electrode active material for a non-aqueous electrolyte-based secondary battery in the first aspect of the present invention, characterized in that the fired powders having the composition formula (1) is prepared by firing a raw material mixture consisting of nickel oxide obtained by roasting nickel hydroxide or nickel oxyhydroxide containing nickel, as a main component, and at least one kind of an element selected from other transition metal elements, group 2 elements, or group 13 elements, as a side component, and a lithium compound is provided.

In addition, according to a fourth aspect of the present invention, the positive electrode active material for a non-aqueous electrolyte-based secondary battery in the third aspect of the present invention, characterized in that mixing ratio of the nickel oxide and lithium compound is set so that lithium amount in the lithium compound is 1.00 to 1.10 as molar ratio, relative to total amount of nickel and other transition metal elements, group 2 elements, and group 13 elements in the nickel oxide is provided.

In addition, according to a fifth aspect of the present invention, a non-aqueous electrolyte-based secondary battery made by using the positive electrode active material for the non-aqueous electrolyte-based secondary battery, according to any one of the first to the fourth aspects of the present invention is provided.

A positive electrode active material for a non-aqueous electrolyte-based secondary battery of the present invention is one whose suitable specific surface area is specified by clarifying true reaction surface area, by carrying out water washing processing under suitable condition; and it is a positive electrode active material for a non-aqueous electrolyte-based secondary battery, consisting of a lithium/nickel composite oxide with high capacity, low cost and excellent heat stability. Industrial value thereof is extremely great, because a non-aqueous electrolyte-based secondary battery having high capacity and high safety can be obtained using the same.

BRIEF DESCRIPTION OF THE DRAWING

FIG. 1 shows a schematic structure of a 2032 type coin battery.

NOTATION

1. Positive electrode (electrode for evaluation)
2. Separator (impregnated in an electrolysis solution)
3. Lithium metal negative electrode
4. Gasket
5. Positive electrode can
6. Negative electrode can

DETAILED DESCRIPTION OF THE INVENTION

A positive electrode active material for a non-aqueous electrolyte-based secondary battery of the present invention and a non-aqueous electrolyte-based secondary battery using the same will be explained in detail below.

1. A Positive Electrode Active Material for a Non-Aqueous Electrolyte-Based Secondary Battery The above positive electrode active material is a positive electrode active material consisting of lithium/nickel composite oxide powders obtainable by water washing fired powders having the following composition formula (1), followed by filtering and drying:

$$LiNi_{1-a}M_aO_2 \quad (1)$$

(wherein, M represents at least one kind of an element selected from transition metal elements other than Ni, group 2 elements, or group 13 elements; and "a" satisfies $0.01 \leq a \leq 0.5$), characterized in that specific surface area of the lithium/nickel composite oxide powders after water washing is 0.3 to 2.0 m$^2$/g.

It is important for the positive electrode active material to have a specific surface area of 0.3 to 2.0 m$^2$/g, after water washing processing of powders obtainable by water washing under specified condition and processing by the drying step (hereafter may be referred to as specific surface area after water washing processing), to sufficiently remove impurities or by-products adhered at the surface area of the fired powders. In this way, a positive electrode active material with excellent heat stability suitable as a non-aqueous electrolyte-based secondary battery can be obtained; and a non-aqueous electrolyte-based secondary battery with high capacity and high safety can be obtained using this positive electrode active material.

Now, problems on characteristics of a usual positive electrode active material will be clarified, then characteristics of a positive electrode active material relevant to the present invention will be explained in detail.

In general, in the case where a lithium/nickel composite oxide is used as a positive electrode active material for a secondary battery, charge and discharge is carried out by elimination or insertion of lithium ions in crystal structure thereof. Usually, pure lithium nickelate not substituted with a metal element or the like shows abrupt phase transition of crystal structure in volume change during charge and discharge accompanying with a charging and discharging cycle, which may sometimes generate crack in particles, or large gap in grain boundary. In addition, in particular, it is inferior in heat stability during charging as compared with lithium cobaltate and lithium manganate. For example, in the case where a lithium nickelate is used as a positive electrode active material, it is known that very fierce heat is generated instantaneously at about 210° C., from DSC (differential scanning calorimetry) analysis of a positive electrode active material in an over charge state. Two major causes for this phenomenon are considered, namely, one is oxidation and decomposition of an electrolysis solution by oxygen release accompanying with collapse of crystal structure of lithium nickelate, triggered by instability of crystal structure occurring in elimination of lithium ions in the crystal structure; and the other is largeness of surface area of lithium/nickel composite oxide particles, that is reaction surface area, contacting with the electrolysis solution in this occasion.

As for instability of the crystal structure, it is known that it can be improved by making solid solution of aluminum or the like effective to stabilization of the crystal structure, as a form of substitution of a part of nickel. By this method, however, as described above, satisfaction of both improvement of heat stability and prevention of capacity reduction is difficult. Therefore, it is desirable to produce a lithium/nickel composite oxide having small surface area of positive electrode active material particles contacting with an electrolysis solution, however, there are many cases that improvement of heat stability does not practically be attained. Namely, there is no sufficient correlativity between specific surface area of a lithium/nickel composite oxide produced by a conventional method, measured by a gas adsorption method (BET method), and heat stability of a positive electrode active material or safety of a battery. This tendency is particularly obviously observed in a lithium/nickel composite oxide compared with other material; this may be caused by property of a lithium/nickel composite oxide.

For example, in the case of firing at high temperature in order to widely grow primary particles of a lithium/nickel composite oxide, corruption of layer structure of the crystal occurs, giving adverse effect on charge and discharge characteristics, therefore, firing at high temperature of the same level in lithium cobaltate and lithium manganate cannot be carried out. Therefore, firing at relatively low temperature provides a positive electrode active material of an aggregation of relatively small primary particles, and more particle boundaries than the case of lithium cobaltate. In this case, lithium compounds not reacted in firing remain and adhere at the particle surface in a form of lithium oxide, lithium sulfate, lithium carbonate or the like, and in particular, exist so as to fill the gaps of the particle boundaries and the like.

It was clarified that true reaction surface area of the positive electrode active material itself could not be measured, in measurement of specific surface area of a lithium/nickel composite oxide by a BET method, because areas without gas permeation are generated by influence of the above property.

In addition, a method for increasing mixing ratio of a lithium compound is often adopted to promote firing at low temperature, however, this method led to increase in residual lithium compounds after synthesis, which affected measurement value by a BET method.

In this connection, in electrode preparation in the practical battery production process, paste is prepared by dispersing a positive electrode active material into, in general, a solvent (aqueous or organic solvent), then by application and fabrication work is carried out onto a collector. It is estimated that, in this case, adhered substances at the particle surface dissolve or peel, and thus represent, in high probability, true specific surface area (surface participating in reaction with an electrolysis solution) of the positive electrode active material. In addition, expansion and shrinkage of the positive electrode active material accompanying with charge and discharge of a battery is also estimated to promote peeling of adhered substances at the particle surface of the positive electrode active material. In the above view points, because specific surface area, after firing, of a lithium/nickel composite oxide produced by a conventional method does not represent true specific surface area, it is important for measured value of specific surface area to be small, after removing adhered substances by a method of some kind.

As specific surface area of a positive electrode active material composed of a lithium/nickel composite oxide of the present invention, specific surface area after water washing processing is 0.3 to 2.0 m$^2$/g, preferably 0.3 to 1.5 m$^2$/g, and more preferably 0.3 to 0.8 m$^2$/g. Namely, it is because specific surface area after water washing processing over 2.0 m$^2$/g shows abruptly high heat generation amount by a reaction with an electrolysis solution, which incurs reduction of heat stability. On the other hand, specific surface area below 0.3 m$^2$/g significantly reduces load characteristics as a battery, although heat generation is suppressed.

Measurement of the above specific surface area is carried out by a gas adsorption method (BET method) as follows: slurry is formed by the addition of water into the above fired powders, and water washed within a time satisfying the following equation (2) in response to concentration of the slurry, and powders processed by the steps of filtering and drying of the slurry after water washing is used. Namely, it is because the time of the water washing longer than the time calculated by the equation (2) re-deposits lithium carbonates at powder surface, by absorption of carbon dioxide gas in atmosphere by large amounts of a high pH aqueous solution. Note that impurities or by-products adhered at the surface of the fired powders can sufficiently be removed.

$$A = B/40 \quad (2)$$

(wherein, A represents water washing time in a unit of minute, and B represents slurry concentration in a unit of g/L).

The slurry concentration in the above water washing is not especially limited, however, preferably 200 to 50000 g/L, and more preferably 500 to 2000 g/L. Namely, higher slurry concentration provides more powder amount, and the concentration over 50000 g/L not only makes stirring difficult due to very high viscosity, but also delays dissolving rate of adhered substances, based on an equilibrium relation, due to high alkaline in the solution, and thus makes difficult separation from powders even when peeling occurs. On the other hand, the slurry concentration below 200 g/L increases elution amount of lithium due to being a too dilute solution, and may also generate elimination of lithium from crystal lattice of a positive electrode active material, which not only makes crystal collapse easy but also re-deposits lithium carbonates, by absorption of carbon dioxide gas in atmosphere by a high pH aqueous solution. In addition, in consideration of productivity from industrial viewpoint, and in facility capability and workability, the slurry concentration is desirably 500 to 2000 g/L.

Water used above is not especially limited, however, water having an electric conductivity of below 10 μS/cm is preferable, and water having an electric conductivity of below 1 μS/cm is more preferable. Namely, water having an electric conductivity of below 10 μS/cm is capable of preventing deterioration of battery performance caused by adhesion of impurities at a positive electrode active material.

Temperature of the drying is not especially limited, however, preferably 80 to 700° C., more preferably 100 to 550° C., and further preferably 120 to 350° C. Namely, temperature of the drying equal to or higher than 80° C. is capable of rapidly drying a positive electrode active material after water washing, and thus preventing generation of lithium concentration gradient between the surface and the inside of the particles. On the other hand, because the vicinity of the surface of a positive electrode active material is in a very near state of stoichiometric ratio, or in a charged state by certain lithium elimination, the temperature over 700° C. may trigger collapse of powder crystal structure in a nearly charged state, which could then lower electric characteristics. In addition, to reduce risk about property and characteristics of a positive electrode active material after water washing, 100 to 550° C. is desirable, and further in consideration of productivity and heat energy cost, 120 to 350° C. is more desirable. In this case, as a method for drying, powders after filtering is preferably dried by charging in a dryer preheated at a specified temperature under gas atmosphere not containing compound components having carbon and sulfur, or under vacuum atmosphere.

Water content of the powders after the drying is not especially limited, however, preferably equal to or lower than 0.2% by mass, more preferably 0.1% by mass and further preferably 0.05% by mass. Namely, it is because the water content of powders over 0.2% by mass triggers generation of a lithium compound at the surface by absorption of gas components including carbon and sulfur in atmosphere. Note that the water content is one measured by a Karl Fischer water content measurement apparatus.

Fired powders having the component formula (1) are prepared, for example, by firing a raw material mixture containing nickel oxide obtained by roasting nickel hydroxide or nickel oxyhydroxide containing nickel, as a main component, and at least one kind of an element selected from other transition metal elements, group 2 elements, or group 13 elements, as a side component, and a lithium compound.

2. A Production Method for a Positive Electrode Active Material for a Non-Aqueous Electrolyte-Based Secondary Battery The production method is characterized by including the following steps (a) to (c):

(a) A nickel oxide containing nickel, as a main component, and at least one kind of an element selected from other transition metal elements, group 2 elements, or group 13 elements, as a side component is prepared by roasting nickel hydroxide or nickel oxyhydroxide containing nickel, as a main component, and at least one kind of an element selected from other transition metal elements, group 2 elements, or group 13 elements, as a side component, at a temperature of 600 to 1100° C. under air atmosphere.

(b) Fired powders represented by the following composition formula (1) are prepared by mixing the nickel oxide and a lithium compound, and then firing:

$$LiNi_{1-a}M_aO_2 \quad (1)$$

(wherein, M represents at least one kind of an element selected from transition metal elements other than Ni, group 2 elements, or group 13 elements; and "a" satisfies $0.01 \leq a \leq 0.5$).

(c) The fired powders are washed with water, within a time satisfying the following equation (2) in water desirably, and then filtered and dried:

$$A = B/40 \quad (2)$$

(wherein, A represents water washing time in a unit of minute; and B represents slurry concentration in a unit of g/L).

In the above production method, it is important that fired powders with a specified composition is obtained by using a nickel oxide prepared under specified condition, and then subjecting these to water washing processing under specified condition. In this way, a positive electrode active material with a specific surface area after water washing of 0.3 to 2.0 m²/g, and having high capacity, low cost and excellent heat stability, suitable to a non-aqueous electrolyte-based secondary battery can be obtained.

In this connection, to obtain the positive electrode active material, a lithium/nickel composite oxide obtained by various methods may be used, however, those obtained by a mixing and firing method of a nickel compound solution-treated or dispersed a metal element other than lithium, by a crystallization method, and a lithium compound are preferable among these. Namely, in general, a representative method for producing a lithium/nickel composite oxide includes a method for using a nickel compound solution-treated or dispersed a metal element other than lithium, by a crystallization method, and a lithium compound, as raw material, and by mixing and firing these; a method for spray pyrolysis processing of a solution mixed with whole of an aqueous solution containing desired metal elements; and a method for crushing and mixing whole of desired metal elements by mechanical crushing such as ball mill, and then firing these.

However, methods other than a production method for nickel raw material by a crystallization method are not capable of efficiently improving heat stability by furnishing water washing processing in accordance with a method of the present invention, because of very large specific surface area of the resultant lithium/nickel composite oxide. In addition, use of a crystallization method is capable of producing nickel hydroxide or nickel oxyhydroxide, as a nickel compound to form spherical particles with high bulk density, suitable as a positive electrode active material, and is thus most suitable to produce a lithium/nickel composite oxide with small specific surface area after water washing processing.

The step (a) of the above production method is a step for preparation of a nickel oxide containing nickel, as a main component, and at least one kind of an element selected from other transition metal elements, group 2 elements, or group 13 elements, as a side component, by roasting nickel hydroxide or nickel oxyhydroxide containing nickel, as a main component, and at least one kind of an element selected from other transition metal elements, group 2 elements, or group 13 elements, as a side component, at a temperature of 600 to 1100° C. under air atmosphere.

Nickel hydroxide used in the step (a) is not especially limited, and those obtainable by a crystallization method under various conditions may be used, however, those are preferable among these, which are prepared, for example, by dropping an aqueous solution of a metal compound containing nickel, as a main component, and at least one kind of an element selected from other transition metal elements, group 2 elements, or group 13 elements, as a side component, and an aqueous solution containing an ammonium ion donor into a reaction tank warmed at 40 to 60° C., and at the same time, an aqueous solution of an alkali metal hydroxide in an amount sufficient to maintain pH of the reaction solution at 10 to 14 is dropped, as appropriate, if desired. Namely, nickel hydroxide produced by this method is a powder with high bulk density, and thus suitable as raw material of a lithium/nickel composite oxide used as a positive electrode active material for a non-aqueous electrolyte-based secondary battery.

Namely, the temperature over 60° C., or the pH over 14 does not promote crystal growth due to higher priority of nucleation in the solution, which thus provides only fine powders. On the other hand, the temperature below 40° C., or the pH below 10 generates fewer nucleus in the solution, and crystal growth of particles has a priority, which thus forms very large particles so as to generate concavity and convexity in electrode preparation, or increases residual amount of metal ions in the reaction solution and reduces reaction efficiency very badly, and thus both conditions generate problems.

Nickel oxyhydroxide used in the step (a) is not especially limited, however, those prepared by further addition of an oxidizing agent such as sodium hypochlorite, and an aqueous solution of hydrogen peroxide to the nickel hydroxide are preferable. Namely, nickel oxyhydroxide produced by this method is a powder with high bulk density, and thus suitable as raw material of a lithium/nickel composite oxide used as a positive electrode active material for a non-aqueous electrolyte-based secondary battery.

Roasting condition of the nickel hydroxide or nickel oxyhydroxide is not especially limited and, for example, the roasting is carried out under air atmosphere, preferably at 600 to 1100° C., and more preferably at 900 to 1000° C. For example, in the case where a nickel compound such as nickel hydroxide or nickel oxyhydroxide is mixed and fired as it is with a lithium compound, it is difficult to yield a lithium/nickel composite oxide having low specific surface area after washing.

In more detail, even though specific surface area of a lithium/nickel composite oxide obtained by mixing these with a lithium compound, and firing is seemingly small, many amounts of crystal water and anions such as $SO_4^{-2}$ and the like are present in the crystal of the nickel compound, therefore contact area of primary particles themselves composing the particles, is small and void is large. Therefore, lithium compounds left unreacted are present in the void parts, and removal of these by water washing processing may sometimes generate high specific surface area.

Thus, it is required to increase contact area of particles themselves by reducing impurities in a nickel compound as raw material, and to make the void small. As this means, it is effective to grow primary particles composing the particles, by once roasting a nickel hydroxide or nickel oxyhydroxide obtained by a crystallization method.

In this case, the roasting temperature below 600° C. makes difficult to reduce specific surface area of a lithium/nickel composite oxide obtainable using this method, after water washing processing down to equal to or lower than 2.0 m²/g. On the other hand, the roasting temperature over 1100° C. abruptly initiates particle growth of the primary particles composing the particles, and collapses the crystal and shows characteristics like powders after crushing. Therefore, specific surface area of a lithium/nickel composite oxide obtained by this method becomes high, or a lithium/nickel composite oxide cannot be synthesized. Namely, too small reaction surface area of a nickel compound side inhibits reaction with lithium in subsequent preparation of a lithium/nickel composite oxide, and generates separation by specific gravity between a lower layer of a nickel compound having large specific gravity, and an upper layer of a lithium compound in a molten state.

The step (b) of the above production method is the step for preparation of fired powders represented by the composition formula (2), by mixing the nickel compound and lithium compound, and subsequent firing.

In the above mixing, a dry mixing apparatus such as a V blender or the like, or a mixing granulation apparatus or the like is used, and in addition, for the above firing, an electric furnace, kiln, tubular furnace, pusher furnace or the like is used, which is adjusted in gas atmosphere of an oxygen concentration of equal to or higher than 20% by mass, such as oxygen atmosphere or dry air atmosphere processed by dehumidification and decarbonation or the like.

The lithium compound is not especially limited and, for example, at least one kind selected from the group consisting of hydroxide, oxyhydroxide, oxide, carbonate, nitrate and halide of lithium is used.

In the step (b), mixing ratio of the nickel oxide and lithium compound is not especially limited, however, for example, it is preferable that lithium amount in the lithium compound is adjusted to 1.00 to 1.10 in molar ratio, relative to total amount of nickel and other transition metal elements, 2 group elements and 13 group elements.

Namely, the molar ratio below 1.00 provides very poor crystallinity of the resultant fired powders, which may cause much deterioration of battery capacity in charge and discharge cycle. On the other hand, the molar ratio over 1.10 provides a large amount of presence of excess lithium compounds at the surface of the resultant fired powder, and thus makes difficult to remove these by water washing. Therefore, use of such a powder as a positive electrode active material not only generates a large amount of gas in charging a battery, but also causes defect of slurry gelling by a reaction with an organic solvent used in electrode preparation.

Firing temperature used in the step (b) is not especially limited, however, for example, preferably 650 to 850° C., and more preferably 700 to 780° C. is used. Furthermore, 2-stage firing composed of firing for 1 hour or longer at 400 to 600° C., and subsequent firing for 5 hours or longer at 650 to 850° C. is particularly preferable. Namely, heat treatment at a temperature over 500° C., even below 650° C., forms lithium nickelate, but crystal thereof is not well grown and structurally unstable, resulting in easy destruction of the structure by phase transition or the like caused by charge and discharge. On the other hand, heat treatment at a temperature over 850° C. collapses layer-like structure and makes insertion and elimination of lithium ions difficult, or further generates nickel oxide by decomposition.

The step (c) of the above production method is the step for filtering and drying of the fired powders, after water washing within a time satisfying the equation (3).

Here, condition of water washing processing such as slurry concentration, water used or the like, and drying condition such as drying temperature, drying atmosphere, water content of powders after drying or the like, used in the step (c), are the same as explained on the positive electrode active material for a non-aqueous electrolyte-based secondary battery.

The above series of steps provide a positive electrode active material, having a specific surface area after water washing of 0.3 to 2.0 m²/g, and with high capacity, low cost and excellent heat stability, suitable for a non-aqueous electrolyte-based secondary battery, containing lithium/nickel composite oxide powders represented by the following composition formula (1):

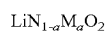  (1)

(wherein, M represents at least one kind of an element selected from transition metal elements other than Ni, group 2 elements, or group 13 elements; and "a" satisfies $0.01 \leq a \leq 0.5$), characterized in that.

3. A non-Aqueous Electrolyte-Based Secondary Battery

A non-aqueous electrolyte-based secondary battery of the present invention is a non-aqueous electrolyte-based secondary battery having high capacity and high safety, using a positive electrode active material composed of the above lithium/nickel composite oxide, in particular, a lithium/nickel composite oxide obtained by the above production method, as a positive electrode active material to prepare a positive electrode, and by incorporating these.

Now, a preparation method for a positive electrode used in a non-aqueous electrolyte-based secondary battery of the present invention will be explained, however, the present invention should not be limited thereto. For example, such a positive electrode may be prepared that a positive electrode mix, containing positive electrode active material particles and a bonding agent, is supported by a belt-like core material of a positive electrode (a positive electrode collector). Note that the positive electrode mix may further contain additives such as a conductive substance or the like as arbitrary components. To support the positive electrode mix onto the core, paste is prepared first by dispersing the positive electrode mix in a liquid component, and the paste is then applied to the core material and dried.

As the bonding agent of the positive electrode mix, any one of a thermoplastic resin or a thermosetting resin may be used, however, a thermoplastic resin is preferable. As the thermoplastic resin, for example, polyethylene, polypropylene, polytetrafluoroethylene (PTFE), polyvinylidene fluoride (PVDF), styrene-butadiene rubber, a copolymer of tetrafluoroethylene-hexafluoropropylene (FEP), a copolymer of tetrafluoroethylene-perfluoroalkyl vinyl ether (PFA), a copolymer of vinylidene fluoride-hexafluoropropylene, a copolymer of vinylidene fluoride-chlorotrifluoroethylene, a copolymer of ethylene-tetrafluoroethylene (ETFE), polychlorotrifluoroethylene (PCTFE), a copolymer of vinylidene fluoride-pentafluoropropylene, a copolymer of propylene-tetrafluoroethylene, a copolymer of ethylene-chlorotrifluoroethylene (ECTFE), a copolymer of vinylidene fluoride-hexafluoropropylene-tetrafluoroethylene, a copolymer of vinylidene-perfluoromethyl vinyl ether-tetrafluoroethylene, a copolymer of ethylene-acrylic acid, a copolymer of ethylene-methacrylic acid, a copolymer of ethylene-methyl methacrylate, or the like is included. They may be used alone or one or more kinds may be used in combination. In addition, they may be crosslinked substances by $Na^+$ ion or the like.

As the conductive substance of the positive electrode mix, any one may be used as long as it is electron conductive material, which is chemically stable in a battery. For example, graphites such as natural graphite (scale-like graphite or the like) and artificial graphite; carbon blacks such as acetylene black, Ketjen black, channel black, furnace black, lamp black, and thermal black; conductive fibers such as carbon fiber and metal fiber; metal powders such as aluminum and the like; conductive whiskers such as zinc oxide and potassium titanate; conductive metal oxides such as titanium oxide and the like; organic conductive materials such as polyphenylene derivative or the like; fluorinated carbon; or the like may be used. They may be used alone or one or more kinds may be used in combination.

The addition amount of the conductive substance of the positive electrode mix is not especially limited, however, for example, 1 to 50% by mass is preferable, 1 to 30% by mass is more preferable, and 2 to 15% by mass is further preferable, relative to positive electrode active material particles contained in the positive electrode mix.

As the core material of the positive electrode (a positive electrode collector), any one may be used as long as it is an electron conductive substance, which is chemically stable in a battery. For example, a foil or a sheet composed of aluminum, stainless steel, nickel, titanium, carbon, a conductive resin or the like may be used; among these, an aluminum foil, an aluminum alloy foil or the like is more preferable. Here, at the surface of the foil or sheet, a layer of carbon or titanium may be furnished or an oxide layer may be formed. In addition, at the surface of the foil or sheet, concavity and convexity may be furnished; or a net, a punching sheet, a lath board, a porous substance, a foam substance, a fiber group formed substance or the like may also be used.

Thickness of the core material of the positive electrode is not especially limited, and for example, 1 to 500 μm may be used.

Then, configuration elements other than the positive electrode used in a non-aqueous electrolyte-based secondary battery of the present invention will be explained. It should be noted that a non-aqueous electrolyte-based secondary battery of the present invention is characterized by using the positive electrode active material, and thus the other composition elements are not especially limited.

First of all, as a negative electrode, one which is capable of charging and discharging lithium is used, for example, such a negative electrode may be used that a negative electrode mix containing a negative electrode active material and a bonding agent, and further containing a conductive substance or thickener as an arbitrary component is supported by a core material of a negative electrode. Such a negative electrode may be prepared by a similar method as in a positive electrode.

As the negative electrode active material, any one may be used as long as it is capable of electrochemically charging and discharging lithium. For example, graphite, carbon material which is hardly converted to graphite, lithium alloy or the like may be used. As the lithium alloy, an alloy containing at least one kind of an element selected from silicon, tin, aluminum, zinc and magnesium is preferable.

Average particle diameter of the negative electrode active material is not especially limited, and for example, 1 to 30 μm may be used.

As the bonding agent of the negative electrode mix, any one of a thermoplastic resin or a thermosetting resin may be used, however, of a thermoplastic resin is preferable. As the thermoplastic resin, for example, polyethylene, polypropylene, polytetrafluoroethylene (PTFE), polyvinylidene fluoride (PVDF), styrene-butadiene rubber, a copolymer of tetrafluoroethylene-hexafluoropropylene (FEP), a copolymer of tetrafluoroethylene-perfluoroalkyl vinyl ether (PFA), a copolymer of vinylidene fluoride-hexafluoropropylene, a copolymer of vinylidene fluoride-chlorotrifluoroethylene, a copolymer of ethylene-tetrafluoroethylene (ETFE), polychlorotrifluoroethylene (PCTFE), a copolymer of vinylidene fluoride-pentafluoropropylene, a copolymer of propylene-tetrafluoroethylene, a copolymer of ethylene-chlorotrifluoroethylene (ECTFE), a copolymer of vinylidene fluoride-hexafluoropropylene-tetrafluoroethylene, a copolymer of vinylidene-perfluoromethyl vinyl ether-tetrafluoroethylene, a copolymer of ethylene-acrylic acid, a copolymer of ethylene-methacrylic acid, a copolymer of ethylene-methyl methacrylate, or the like is included. They may be used alone or one or more kinds may be used in combination. In addition, they may be crosslinked substances by $Na^+$ ion or the like.

As the conductive substance of the negative electrode mix, any one may be used as long as it is electron conductive material, which is chemically stable in a battery. For example, graphite such as natural graphite (scale-like graphite or the like) and artificial graphite; carbon blacks such as acetylene black, Ketjen black, channel black, furnace black, lamp black, and thermal black; conductive fibers such as carbon fiber and metal fiber; metal powders such as copper and nickel; organic conductive materials such as polyphenylene derivative or the like; or the like may be used. They may be used alone or two or more kinds in combination.

The addition amount of the conductive substance is not especially limited, however, for example, 1 to 30% by mass is preferable, and 1 to 10% by mass is more preferable, relative to negative electrode active material particles contained in the negative electrode mix.

As the core material of the negative electrode (a negative electrode collector), any one may be used as long as it is an electron conductive substance, which is chemically stable in a battery. For example, a foil or a sheet composed of stainless steel, nickel, copper, titanium, carbon, a conductive resin or the like may be used; among these, copper and a copper alloy is preferable. At the surface of the foil or sheet, a layer of carbon, titanium, or nickel may be furnished, or an oxide layer may be formed. In addition, at the surface of the foil or sheet, concavity and convexity may be furnished; or a net, a punching sheet, a lath board, a porous substance, a foam substance, a fiber group formed substance or the like may also be used. Thickness of the core material of the negative electrode is not especially limited, and for example, 1 to 500 µm may be used.

Then, as a non-aqueous electrolysis solution, a non-aqueous solvent dissolved with a lithium salt is preferable. In addition, as the non-aqueous solvent, for example, cyclic carbonates such as ethylene carbonate (EC), propylene carbonate (PC), butylene carbonate (BC), and vinylene carbonate (VC); chained carbonates such as dimethyl carbonate (DMC), diethyl carbonate (DEC), ethyl methyl carbonate (EMC), and dipropyl carbonate (DPC); aliphatic carboxylate esters such as methyl formate, methyl acetate, methyl propionate, and ethyl propionate; lactones such as γ-butyrolactone, and γ-valerolactone; chained ethers such as 1,2-dimethoxyethane (DME), 1,2-diethoxyethane (DEE), and ethoxymethoxyethane (EME); cyclic ethers such as tetrahydrofuran, and 2-methyltetrahydrofuran; dimethylsulfoxide; 1,3-dioxolane; formamide; acetamide; dimethylformamide; dioxolane; acetonitrile; propionitrile; nitoromethane; ethylmonoglyme; phosphate triester; trimethoxymethane; dioxolane derivatives; sulfolane; methylsulfolane; 1,3-dimethyl-2-imidazolidinone; 3-methyl-2-oxazolidinone; propylene carbonate derivatives; tetrahydrofuran derivatives; ethyl ether; 1,3-propane sultone; anisole; N-methyl-2-pyrrolidone; or the like may be used. They may be used alone, however, one or more kinds may preferably be used by mixing. Among these, a mixed solvent of cyclic carbonates and chained carbonates, or a mixed solvent of cyclic carbonates, chained carbonates and aliphatic carboxylate esters is preferable.

As the lithium salt, for example, $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)2$, $LiAsF6$, $LiN(CF_3SO_2)_2$, $LiB_{10}Cl_{10}$, a lithium lower aliphatic carboxylate, LiCl, LiBr, LiI, chloroborane lithium, lithium tetraphenylborate, a lithium imide salt or the like is included. They may be used alone or one or more kinds may be used in combination. In addition, use of at least $LiPF_6$ is preferable. Concentration of the lithium salt in the non-aqueous solvent is not especially limited, however, 0.2 to 2 mol/L is preferable and 0.5 to 1.5 mol/L is more preferable.

Into the non-aqueous solvent, various additives may be added to improve charge and discharge characteristics of a battery. As the additives, for example, triethyl phosphite, triethanol amine, cyclic ether, ethylene diamine, n-glyme, pyridine, hexaphosphoric triamide, nitrobenzene derivatives, crown ethers, quaternary ammonium salts, ethylene glycol dialkyl ethers and the like are included.

In addition a separator is inserted between a positive electrode and a negative electrode. As the separator, thin microporous membrane, with high ion permeability, specified mechanical strength and insulation performance, is preferable. As this thin microporous membrane, one having function of blocking the pores at a temperature equal to or higher than a specified value, and thus increasing resistance is preferable. In addition, as material of the thin microporous membrane, polyolefin such as polypropylene, polyethylene or the like, which is excellent in organic solvent resistance and has hydrophobicity, is preferably used. In addition, a sheet, non-woven fabric, woven textile or the like prepared by glass fiber or the like is also used.

Pore diameter of the separator is, for example, 0.01 to 1 µm. In addition thickness of the separator is, in general, 10 to 300 µm. In addition, void ratio of the separator is, in general, 30 to 80%.

Furthermore, a non-aqueous electrolysis solution and a polymer electrolyte composed of a polymer material supporting the non-aqueous electrolysis solution may also be used as the separator, by incorporation of a positive electrode and a negative electrode into one piece. As this polymer material, any one may be used as long as it is capable of supporting the non-aqueous electrolysis solution, however, in particular, a copolymer of vinylidene fluoride and hexafluoropropylene is preferable.

EXAMPLES

The present invention will be explained in further detail below by referring to Examples and Comparative Examples, however, the present invention is by no means limited thereto. Note that an analysis method of metals and evaluation methods for specific surface area and water content of a lithium/nickel composite oxide used in Examples and Comparative Examples are as follows:

(1) Analysis of metals: It was carried out by an ICP emission analysis method.

(2) Measurement of specific surface area: It was carried out by a BET method.

(3) Measurement of water content: It was measured using a Karl Fischer water content measurement apparatus (Product No. of MKC210) manufactured by Kyoto Electronics Manufacturing Co., Ltd., under condition of a vaporization temperature of 180° C.

Example 1

By a series of the steps composed of the step for preparation of a nickel oxide having a specified composition, the step for preparation of fired powders having a specified composition, and the step for drying the resultant fired powders after water washing processing, a positive electrode active material composed of a lithium/nickel composite oxide was produced, and specific surface area thereof was determined. Furthermore, a coin battery using this positive electrode active material as a positive electrode material was prepared, and initial discharge capacity and DSC heat generation amount thereof were evaluated. In this connection, each raw material was weighed so that each of metal components of the lithium/nickel composite oxide, as the final product, became Ni:Co:Al:Li=0.82:0.15:0.03:1.02.

(1) The Step for Preparation of a Nickel Oxide

First of all, nickel sulfate hexahydrate (product of Wako Pure Chemical Ind., Ltd.), cobalt sulfate heptahydrate (product of Wako Pure Chemical Co., Ltd.) and aluminum sulfate (product of Wako Pure Chemical Ind., Ltd.) were mixed so as to become desired ratio to prepare an aqueous solution. This solution was dropped, together with an ammonium aqueous solution (product of Wako Pure Chemical Ind., Ltd.) and an aqueous solution of sodium hydroxide (product of Wako Pure Chemical Ind., Ltd.) at the same time into a reaction tank with a discharge hole, under stirring, which tank contained water and maintained at 50° C. Here, pH was maintained at 11.5, and by a crystallization method under control of a residual time to become 11 hours, spherical nickel hydroxide aggregated with primary particles was produced. Then, the resultant nickel hydroxide was roasted at a roasting temperature of 600° C. to yield a nickel oxide.

(2) The Step for Preparation of Fired Powders

To the resultant nickel oxide, lithium hydroxide monohydrate (product of Wako Pure Chemical Ind., Ltd.) was added so as to become a desired composition, and mixed using a V blender. The resultant mixture was subjected to preliminary firing at 500° C. for 3 hours under oxygen atmosphere, then to final firing at 765° C. for 20 hours. Subsequently, the inside of a furnace was cooled to room temperature, and then the fired mixture was subjected to crushing processing to yield spherical fired powders aggregated with primary particles; composition thereof was analyzed and the result is shown in Table 1.

(3) The Step for Drying the Fired Powders After Water Washing Processing

To the resultant fired powders, deionized water was added to yield a slurry with a concentration of 2000 g/L; the slurry was stirred for 50 minutes, washed with water, and then powders were taken out by filtering; the resultant powders were left to stand for 10 hours using a vacuum dryer which was warmed at 150° C. Then, specific surface area of the resultant lithium/nickel composite oxide powders was measured and the result is shown in Table 1. Note that water content was 0.07% by mass.

(4) Preparation and Evaluation of a Battery

Using the resultant lithium/nickel composite oxide, a battery was prepared by the following method, and initial discharge capacity and DSC heat generation amount thereof were measured, and the results are shown in Table 2.

[A Preparation Method for a Battery]

To 90 parts by mass of the positive electrode active material powders, 5 parts by mass of acetylene black and 5 parts by mass of polyvinylidene fluoride were mixed, and by the addition of N-methylpyrrolidone, the mixture was converted to paste. This paste was applied onto an aluminum foil with a thickness of 20 μm, so that weight of an active material after drying became 0.05 g/cm$^2$, followed by vacuum drying at 120° C. and then punching out in a circular shape with a diameter of 1 cm to yield a positive electrode.

As a negative electrode, lithium metal was used; and as an electrolysis solution, a mixed solution was used which was composed of equal parts of ethylene carbonate (EC) and diethyl carbonate (DEC), with 1M LiClO$_4$ as a supporting salt. In addition, by infiltrating the electrolysis solution to a separator composed of polyethylene, a 2032 type coin battery was prepared in a glove box under argon gas atmosphere, under control of a dew point of −80° C. FIG. 1 shows schematic structure of the 2032 type coin battery. Note that the coin battery is composed of the positive electrode (electrode for evaluation) 1 in the positive electrode can 5, the lithium metal negative electrode 3 in the negative electrode can 6, the separator 2 infiltrated with the electrolysis solution and the gasket 4.

[An Evaluation Method for Battery Characteristics]

Thus prepared battery was left to stand for about 24 hours to stabilize OCV, then it was subjected to a charge and discharge test under conditions of a current density for the positive electrode of 0.5 mA/cm$^2$, and a cut-off voltage of 4.3 to 3.0 V, to study initial discharge capacity.

In addition, as evaluation of thermal safety, heat generation behavior of the positive electrode mix after initial charging was measured using DSC (differential scanning calorimetry) to evaluate total heat generation amount. The lower DSC heat generation amount shows more excellent heat stability as a positive electrode active material, and thus improves safety of a battery. In more detail, using the 2032 type coin battery, a battery, which was prepared similarly as in measurement of initial discharge capacity, was left to stand for about 24 hours to stabilize OCV, then it was subjected to charging till a current density for the positive electrode of 0.5 mA/cm$^2$, and a voltage of 4.3 V were obtained, and subsequently subjected to constant current-constant voltage charging (CCCV charging), wherein charging was stopped when current value became equal to or lower than 0.01 mA under specified voltage. Then, the charged coin battery was disassembled to take out the inner positive electrode mix, and the electrolysis solution adhered was removed as completely as possible till the amount thereof was equal to or less than 0.05 mg. Then, into an aluminum pan for DSC measurement, 3 mg of the positive electrode mix and 1.3 mg of the electrolysis solution used in the coin battery were charged, and the aluminum pan was sealed by caulking, and by opening a very small hole for gas venting, a measurement sample was completed. Then, 3 mg of alumina powders was similarly sampled and charged in the aluminum pan and caulked to prepare a reference electrode; heat generation behavior thereof was observed by DSC in a temperature range from room temperature to 305° C., by scanning under a temperature raising rate condition of 10° C./min. A DSC apparatus used here is a DSC-10A model manufactured by Rigaku Co., Ltd.

Example 2

A lithium/nickel composite oxide was produced similarly as in Example 1, except that roasting temperature of nickel hydroxide was changed to 900° C. in the step of preparation of the nickel oxide; composition and specific surface area of the resultant powders, along with initial discharge capacity and DSC heat generation amount of the battery were measured and the results are shown in Tables 1 and 2, respectively.

Example 3

A lithium/nickel composite oxide was produced similarly as in Example 1, except that roasting temperature of nickel hydroxide was changed to 1100° C. in the step of preparation of the nickel oxide; composition and specific surface area of the resultant powders, along with initial discharge capacity and DSC heat generation amount of the battery were measured and the results are shown in Tables 1 and 2, respectively.

Example 4

A lithium/nickel composite oxide was produced similarly as in Example 1, except that firing temperature of nickel hydroxide was changed to 700° C. in the step of preparation of the fired powders; composition and specific surface area of the resultant powders, along with initial discharge capacity and DSC heat generation amount of the battery were measured and the results are shown in Tables 1 and 2, respectively.

Example 5

A lithium/nickel composite oxide was produced similarly as in Example 2, except that firing temperature of nickel hydroxide was changed to 700° C. in the step of preparation of the fired powders; composition and specific surface area of the resultant powders, along with initial discharge capacity and DSC heat generation amount of the battery were measured and the results are shown in Tables 1 and 2, respectively.

Example 6

A lithium/nickel composite oxide was produced similarly as in Example 3, except that firing temperature of nickel hydroxide was changed to 700° C. in the step of preparation of the fired powders; composition and specific surface area of the resultant powders, along with initial discharge capacity and DSC heat generation amount of the battery were measured and the results are shown in Tables 1 and 2, respectively.

Example 7

A lithium/nickel composite oxide was produced similarly as in Example 1, except that nickel oxyhydroxide, obtained by oxidation processing of nickel hydroxide by further addition of sodium hypochlorite, was used instead of nickel hydroxide, in the step for preparation of nickel oxide; composition and specific surface area of the resultant powders, along with initial discharge capacity and DSC heat generation amount of the battery were measured and the results are shown in Tables 1 and 2, respectively.

Example 8

A lithium/nickel composite oxide was produced similarly as in Example 2, except that nickel oxyhydroxide, obtained by oxidation processing of nickel hydroxide by further addition of sodium hypochlorite, was used instead of nickel hydroxide, in the step for preparation of nickel oxide; composition and specific surface area of the resultant powders, along with initial discharge capacity and DSC heat generation amount of the battery were measured and the results are shown in Tables 1 and 2, respectively.

Example 9

A lithium/nickel composite oxide was produced similarly as in Example 3, except that nickel oxyhydroxide, obtained by oxidation processing of nickel hydroxide by further addition of sodium hypochlorite, was used instead of nickel hydroxide, in the step for preparation of nickel oxide; composition and specific surface area of the resultant powders, along with initial discharge capacity and DSC heat generation amount of the battery were measured and the results are shown in Tables 1 and 2, respectively.

Example 10

A lithium/nickel composite oxide was produced similarly as in Example 2, except that a raw material aqueous solution was formulated by mixing a nickel sulfate hexahydrate (product of Wako Pure Chemical Ind., Ltd.), cobalt sulfate heptahydrate (product of Wako Pure Chemical Co., Ltd.), aluminum sulfate (product of Wako Pure Chemical Ind., Ltd.), manganese sulfate pentahydrate (product of Wako Pure Chemical Ind., Ltd.), and magnesium sulfate heptahydrate (product of Wako Pure Chemical Co., Ltd.), so that each of metal components of the lithium/nickel composite oxide, as the final product, became Ni:Co:Al:Mn:Mg:Li=0.777:0.149:0.035:0.027:0.012:1.02, in the step for preparation of nickel oxide; composition and specific surface area of the resultant powders, along with initial discharge capacity and DSC heat generation amount of the battery were measured and the results are shown in Tables 1 and 2, respectively.

Example 11

A lithium/nickel composite oxide was produced similarly as in Example 2, except that a raw material aqueous solution was formulated by mixing a nickel sulfate hexahydrate (product of Wako Pure Chemical Ind., Ltd.), cobalt sulfate heptahydrate (product of Wako Pure Chemical Co., Ltd.), aluminum sulfate (product of Wako Pure Chemical Ind., Ltd.), and manganese sulfate pentahydrate (product of Wako Pure Chemical Ind., Ltd.), so that each of metal components of the lithium/nickel composite oxide, as the final product, became Ni:Co:Al:Mn:Li=0.786:0.151:0.035:0.028:1.02, in the step for preparation of nickel oxide; composition and specific surface area of the resultant powders, along with initial discharge capacity and DSC heat generation amount of the battery were measured and the results are shown in Tables 1 and 2, respectively.

Example 12

A lithium/nickel composite oxide was produced similarly as in Example 2, except that a raw material aqueous solution was formulated by mixing a nickel sulfate hexahydrate (product of Wako Pure Chemical Ind., Ltd.), cobalt sulfate heptahydrate (product of Wako Pure Chemical Co., Ltd.), aluminum sulfate (product of Wako Pure Chemical Ind., Ltd.), and magnesium sulfate heptahydrate (product of Wako Pure Chemical Co., Ltd.), so that each of metal components of the lithium/nickel composite oxide, as the final product, became Ni:Co:Al:Mg:Li=0.804:0.148:0.036:0.012:1.02, in the step for preparation of nickel oxide; composition and specific surface area of the resultant powders, along with initial discharge capacity and DSC heat generation amount of the battery were measured and the results are shown in Tables 1 and 2, respectively.

Example 13

A lithium/nickel composite oxide was produced similarly as in Example 2, except that a raw material aqueous solution was formulated by mixing a nickel sulfate hexahydrate (product of Wako Pure Chemical Ind., Ltd.) and aluminum sulfate (product of Wako Pure Chemical Ind., Ltd, so that each of metal components of the lithium/nickel composite oxide, as the final product, became Ni:Al:Li=0.99:0.01:1.02, in the step for preparation of nickel oxide; composition and specific surface area of the resultant powders, along with initial discharge capacity and DSC heat generation amount of the battery were measured and the results are shown in Tables 1 and 2, respectively.

Example 14

A lithium/nickel composite oxide was produced similarly as in Example 2, except that a raw material aqueous solution was formulated by mixing a nickel sulfate hexahydrate (product of Wako Pure Chemical Ind., Ltd.), cobalt sulfate heptahydrate (product of Wako Pure Chemical Co., Ltd.) and aluminum sulfate (product of Wako Pure Chemical Ind., Ltd, so that each of metal components of the lithium/nickel composite oxide, as the final product, became Ni:Co:Al:Li=0.50: 0.47:0.03:1.02, in the step for preparation of nickel oxide; composition and specific surface area of the resultant powders, along with initial discharge capacity and DSC heat generation amount of the battery were measured and the results are shown in Tables 1 and 2, respectively.

Example 15

A lithium/nickel composite oxide was produced similarly as in Example 2, except that a lithium/nickel composite oxide with a water content of 0.20% by mass was produced by leaving at rest the powders taken out by filtering, in a vacuum dryer for 6 hours, which was warmed at 110° C.; composition and specific surface area of the resultant powders, along with initial discharge capacity and DSC heat generation amount of the battery were measured and the results are shown in Tables 1 and 2, respectively.

Example 16

A lithium/nickel composite oxide was produced similarly as in Example 2, except that a raw material aqueous solution was formulated by mixing a nickel sulfate hexahydrate (product of Wako Pure Chemical Ind., Ltd.), cobalt sulfate heptahydrate (product of Wako Pure Chemical Co., Ltd.) and aluminum sulfate (product of Wako Pure Chemical Ind., Ltd, so that each of metal components of the lithium/nickel composite oxide, as the final product, became Ni:Co:Al:Li=0.81: 0.15:0.03:1.00, in the step for preparation of nickel oxide; composition and specific surface area of the resultant powders, along with initial discharge capacity and DSC heat generation amount of the battery were measured and the results are shown in Tables 1 and 2, respectively.

Example 17

A lithium/nickel composite oxide was produced similarly as in Example 2, except that a raw material aqueous solution was formulated by mixing a nickel sulfate hexahydrate (product of Wako Pure Chemical Ind., Ltd.), cobalt sulfate heptahydrate (product of Wako Pure Chemical Co., Ltd.) and aluminum sulfate (product of Wako Pure Chemical Ind., Ltd, so that each of metal components of the lithium/nickel composite oxide, as the final product, became Ni:Co:Al:Li=0.81: 0.15:0.03:1.10, in the step for preparation of nickel oxide; composition and specific surface area of the resultant powders, along with initial discharge capacity and DSC heat generation amount of the battery were measured and the results are shown in Tables 1 and 2, respectively.

Comparative Example 1

A lithium/nickel composite oxide was produced similarly as in Example 1, except that nickel hydroxide was not subjected to roasting; composition and specific surface area of the resultant powders, along with initial discharge capacity and DSC heat generation amount of the battery were measured and the results are shown in Tables 1 and 2, respectively.

Comparative Example 2

A lithium/nickel composite oxide was produced similarly as in Example 1, except that roasted temperature of nickel hydroxide was set at 500° C. in the step for preparation of nickel oxide; composition and specific surface area of the resultant powders, along with initial discharge capacity and DSC heat generation amount of the battery were measured and the results are shown in Tables 1 and 2, respectively.

Comparative Example 3

A lithium/nickel composite oxide was produced similarly as in Example 1, except that roasted temperature of nickel hydroxide was set at 1200° C. in the step for preparation of nickel oxide; composition and specific surface area of the resultant powders, along with initial discharge capacity and DSC heat generation amount of the battery were measured and the results are shown in Tables 1 and 2, respectively.

Comparative Example 4

A lithium/nickel composite oxide was produced similarly as in Example 2, except that a raw material aqueous solution was formulated by mixing a nickel sulfate hexahydrate (product of Wako Pure Chemical Ind., Ltd.) and aluminum sulfate (product of Wako Pure Chemical Ind., Ltd, so that each of metal components of the lithium/nickel composite oxide, as the final product, became Ni:Al:Li=0.995:0.05:1.02, in the step for preparation of nickel oxide; composition and specific surface area of the resultant powders, along with initial discharge capacity and DSC heat generation amount of the battery were measured and the results are shown in Tables 1 and 2, respectively.

Comparative Example 5

A lithium/nickel composite oxide was produced similarly as in Example 2, except that a raw material aqueous solution was formulated by mixing a nickel sulfate hexahydrate (product of Wako Pure Chemical Ind., Ltd.), cobalt sulfate heptahydrate (product of Wako Pure Chemical Co., Ltd.) and aluminum sulfate (product of Wako Pure Chemical Ind., Ltd, so that each of metal components of the lithium/nickel composite oxide, as the final product, became Ni:Co:Al:Li=0.40: 0.57:0.03:1.02, in the step for preparation of nickel oxide; composition and specific surface area of the resultant powders, along with initial discharge capacity and DSC heat generation amount of the battery were measured and the results are shown in Tables 1 and 2, respectively.

Comparative Example 6

A lithium/nickel composite oxide was produced similarly as in Example 3, except that final firing temperature was set at 850° C. in the step for preparation of fired powders; composition and specific surface area of the resultant powders, along with initial discharge capacity and DSC heat generation amount of the battery were measured and the results are shown in Tables 1 and 2, respectively.

Comparative Example 7

A lithium/nickel composite oxide was produced similarly as in Example 2, except that a lithium/nickel composite oxide with a water content of 0.31% by mass was produced by leaving at rest the powders taken out by filtering, in a vacuum dryer for 6 hours, which was warmed at 90° C.; composition and specific surface area of the resultant powders, along with initial discharge capacity and DSC heat generation amount of the battery were measured and the results are shown in Tables 1 and 2, respectively. Note that in preparation of the electrode, a part of the past showed gelling phenomenon, and viscosity thereof was abnormally high.

Comparative Example 8

A lithium/nickel composite oxide was produced similarly as in Example 2, except that a raw material aqueous solution was formulated by mixing a nickel sulfate hexahydrate (product of Wako Pure Chemical Ind., Ltd.), cobalt sulfate heptahydrate (product of Wako Pure Chemical Co., Ltd.) and aluminum sulfate (product of Wako Pure Chemical Ind., Ltd, so that each of metal components of the lithium/nickel composite oxide, as the final product, became Ni:Co:Al:Li=0.81: 0.15:0.03:0.98, in the step for preparation of nickel oxide; composition and specific surface area of the resultant powders, along with initial discharge capacity and DSC heat generation amount of the battery were measured and the results are shown in Tables 1 and 2, respectively.

Comparative Example 9

A lithium/nickel composite oxide was produced similarly as in Example 2, except that a raw material aqueous solution was formulated by mixing a nickel sulfate hexahydrate (product of Wako Pure Chemical Ind., Ltd.), cobalt sulfate heptahydrate (product of Wako Pure Chemical Co., Ltd.) and aluminum sulfate (product of Wako Pure Chemical Ind., Ltd, so that each of metal components of the lithium/nickel composite oxide, as the final product, became Ni:Co:Al:Li=0.81: 0.15:0.03:1.13, in the step for preparation of nickel oxide; composition and specific surface area of the resultant powders, along with initial discharge capacity and DSC heat generation amount of the battery were measured and the results are shown in Tables 1 and 2, respectively. In addition, the battery of this case showed a large amount of gas generation in DSC measurement.

TABLE 1

| | Raw material form of nickel oxide | Roasting Temp. (° C.) | Final Firing Temp. (° C.) | Chemical Comp. after firing | Specific surface area after water washing (m$^2$/g) |
|---|---|---|---|---|---|
| Example 1 | NiOH | 600 | 765 | $Li_{1.02}Ni_{0.81}Co_{0.16}Al_{0.03}O_2$ | 1.50 |
| Example 2 | | 900 | | $Li_{1.02}Ni_{0.82}Co_{0.15}Al_{0.03}O_2$ | 1.05 |
| Example 3 | | 1100 | | $Li_{1.02}Ni_{0.82}Co_{0.15}Al_{0.03}O_2$ | 0.45 |
| Example 4 | | 600 | 700 | $Li_{1.02}Ni_{0.83}Co_{0.14}Al_{0.03}O_2$ | 1.91 |
| Example 5 | | 900 | | $Li_{1.02}Ni_{0.82}Co_{0.15}Al_{0.03}O_2$ | 1.25 |
| Example 6 | | 1100 | | $Li_{1.02}Ni_{0.82}Co_{0.15}Al_{0.03}O_2$ | 0.41 |
| Example 7 | NiOOH | 600 | 765 | $Li_{1.02}Ni_{0.81}Co_{0.16}Al_{0.03}O_2$ | 1.19 |
| Example 8 | | 900 | | $Li_{1.02}Ni_{0.83}Co_{0.14}Al_{0.03}O_2$ | 0.83 |
| Example 9 | | 1100 | | $Li_{1.02}Ni_{0.81}Co_{0.16}Al_{0.03}O_2$ | 0.30 |
| Example 10 | NiOH | 900 | 765 | $Li_{1.02}Ni_{0.777}Co_{0.149}Al_{0.035}Mn_{0.027}Mg_{0.012}O_2$ | 0.69 |
| Example 11 | | | | $Li_{1.02}Ni_{0.786}Co_{0.151}Al_{0.035}Mn_{0.028}O_2$ | 0.64 |
| Example 12 | | | | $Li_{1.02}Ni_{0.804}Co_{0.148}Al_{0.036}Mg_{0.012}O_2$ | 0.68 |
| Example 13 | | | | $Li_{1.02}Ni_{0.99}Al_{0.01}O_2$ | 1.08 |
| Example 14 | | | | $Li_{1.02}Ni_{0.50}Co_{0.47}Al_{0.03}O_2$ | 1.21 |
| Example 15 | | | | $Li_{1.02}Ni_{0.82}Co_{0.15}Al_{0.03}O_2$ | 1.01 |
| Example 16 | | | | $Li_{1.00}Ni_{0.82}Co_{0.15}Al_{0.03}O_2$ | 1.15 |
| Example 17 | | | | $Li_{1.10}Ni_{0.82}Co_{0.15}Al_{0.03}O_2$ | 0.92 |
| Comparative Example 1 | NiOH | — | 765 | $Li_{1.02}Ni_{0.82}Co_{0.15}Al_{0.03}O_2$ | 2.56 |
| Comparative Example 2 | | 500 | | $Li_{1.02}Ni_{0.82}Co_{0.15}Al_{0.03}O_2$ | 2.22 |
| Comparative Example 3 | | 1200 | | incomplete synthesis | — |
| Comparative Example 4 | | 900 | | $Li_{1.02}Ni_{0.995}Al_{0.005}O_2$ | 1.13 |
| Comparative Example 5 | | 900 | | $Li_{1.02}Ni_{0.40}Co_{0.57}Al_{0.03}O_2$ | 1.28 |
| Comparative Example 6 | | 1100 | 850 | $Li_{1.02}Ni_{0.82}Co_{0.15}Al_{0.03}O_2$ | 0.22 |
| Comparative Example 7 | | 900 | 765 | $Li_{1.02}Ni_{0.82}Co_{0.15}Al_{0.03}O_2$ | 0.93 |
| Comparative Example 8 | | 900 | | $Li_{0.98}Ni_{0.82}Co_{0.15}Al_{0.03}O_2$ | 1.31 |
| Comparative Example 9 | | 900 | | $Li_{1.13}Ni_{0.82}Co_{0.15}Al_{0.03}O_2$ | 0.91 |

(Note) NiOH: nickel hydroxide, NiOOH: nickel oxyhydroxide

TABLE 2

| | Initial discharge capacity (mAh/g) | DSC heat generation amount (absolute value) |
|---|---|---|
| Example 1 | 188 | 72 |
| Example 2 | 187 | 58 |
| Example 3 | 186 | 43 |
| Example 4 | 187 | 77 |
| Example 5 | 186 | 70 |
| Example 6 | 185 | 50 |
| Example 7 | 189 | 69 |
| Example 8 | 187 | 57 |
| Example 9 | 184 | 44 |
| Example 10 | 186 | 58 |
| Example 11 | 186 | 60 |
| Example 12 | 186 | 55 |
| Example 13 | 198 | 84 |
| Example 14 | 180 | 53 |
| Example 15 | 185 | 60 |
| Example 16 | 188 | 63 |
| Example 17 | 189 | 65 |
| Comparative Example 1 | 187 | 100 |
| Comparative Example 2 | 187 | 96 |
| Comparative Example 3 | — | — |
| Comparative Example 4 | 199 | 93 |

TABLE 2-continued

| | Initial discharge capacity (mAh/g) | DSC heat generation amount (absolute value) |
|---|---|---|
| Comparative Example 5 | 169 | 43 |
| Comparative Example 6 | 151 | 30 |
| Comparative Example 7 | 168 | 51 |
| Comparative Example 8 | 173 | 75 |
| Comparative Example 9 | 189 | 65 |

As shown in Table 1, lithium/nickel composite oxides in Examples 1 to 17 were produced in accordance with condition of a positive electrode active material of the present invention, and all of the specific surface area after water washing were within 0.3 to 2.0 m²/g, and thus batteries prepared using these as positive electrode active materials are found to have high capacity and improved safety, as shown by Table 2.

In more detail, Table 1 shows that roasting at a temperature of 600 to 1100° C. provides smaller specific surface area after water washing processing at the level of 0.3 to 2.0 m²/g compared with that with no roasting; raising the roasting temperature from 600° C. to 1100° C. promotes sintering and particle growth, and shows tendency to decrease specific surface area of the fired powders after washing processing, or the like. In addition, Table 2 shows that any of the initial discharge capacity showing a battery characteristics is value over 180 mAh/g, which represents high capacity and being stable without any large change caused by specific surface area. In addition, reducing effect of specific surface area is significantly large on DSC heat generation amount, and smaller specific surface area after water washing processing showed tendency to provide less heat generation.

On the other hand, Comparative Example 1 or 2 does not satisfy the above condition, and thus specific surface area of the resultant lithium/nickel composite oxide after water washing is over 2.0 m²/g, therefore safety of a battery is not satisfied because of having increased DSC heat generation amount. In addition, in Comparative Example 3, too high roasting temperature provided incomplete synthesis of a lithium/nickel composite oxide. Furthermore, in Comparative Example 4 or 5, molar ratio of Li to a metal other than Ni is below 0.01 or over 0.5, which generated abnormal heat generation, or reduced initial discharge capacity. In addition, as in Comparative Example 6, specific surface area after water washing below 0.3 m²/g abruptly reduced initial discharge capacity, even though roasting temperature and final firing temperature were within a desired range. In addition, in Comparative Example 7, water content over 0.2% by mass also reduced initial discharge capacity due to formation of byproducts derived from adsorption and reaction of a Li component at the surface with $CO_2$ or sulfur compounds. In addition, in Comparative Example 8, small amount of Li reduced initial discharge capacity. Furthermore, in Comparative Example 9, excess Li caused a large quantity of gas generation.

As is clear from the above results, a positive electrode active material for a non-aqueous electrolyte-based secondary battery and a non-aqueous electrolyte-based secondary battery using the same of the present invention is one composed of a lithium/nickel composite oxide having high capacity, low cost and excellent heat stability; this active material is suitable as a secondary battery which is capable of charging and discharging, and is utilized, in particular, in a small sized electronics device, because of providing a non-aqueous electrolyte-based secondary battery with high capacity and high safety.

What is claimed is:

1. A positive electrode active material for a non-aqueous electrolyte-based secondary battery, consisting of lithium/nickel composite oxide powders obtained by water washing fired powders, in a slurry having a concentration of 500 to 50000 g/L, having the following composition formula (1), followed by filtering and drying:

$$LiNi_{1-a}M_aO_2 \tag{1}$$

wherein, M represents Al and Co; and "a" satisfies 0.01<a<0.5, characterized in that specific surface area of said lithium/nickel composite oxide powders after water washing is 0.3 to 2.0 m²/g wherein the fired powders having said composition formula (1) is prepared by firing a raw material mixture comprising nickel oxide obtained by roasting nickel hydroxide or nickel oxyhydroxide containing nickel, as a main component, and an aluminum compound and a cobalt compound, as a side component, and a lithium compound.

2. The positive electrode active material for a non-aqueous electrolyte-based secondary battery according to claim 1, characterized in that water content of said lithium/nickel composite oxide powders is equal to or less than 0.2% by mass.

3. The positive electrode active material for a non-aqueous electrolyte-based secondary battery according to claim 1, characterized in that mixing ratio of said nickel oxide and lithium compound is set so that lithium amount in the lithium compound is 1.00 to 1.10 as molar ratio, relative to total amount of nickel and other transition metal elements, group 2 elements, and group 13 elements in said nickel oxide.

4. A non-aqueous electrolyte-based secondary battery made by using the positive electrode active material for the non-aqueous electrolyte-based secondary battery, according to claim 1.

5. A non-aqueous electrolyte-based secondary battery made by using the positive electrode active material for the non-aqueous electrolyte-based secondary battery, according to claim 2.

6. A non-aqueous electrolyte-based secondary battery made by using the positive electrode active material for the non-aqueous electrolyte-based secondary battery, according to claim 3.

7. A positive electrode active material for a non-aqueous electrolyte-based secondary battery, consisting of lithium/nickel composite oxide powders obtained by water washing fired powders, in a slurry having a concentration of 500 to 50000 g/L, having the following composition formula (1), followed by filtering and drying:

$$LiNi_{1-a}M_aO_2 \tag{1}$$

wherein, M represents Co, Al, Mg and/or Mn; and "a" satisfies 0.01<a<0.5, characterized in that specific surface area of said lithium/nickel composite oxide powders after water washing is 0.3 to 2.0 m²/g.

* * * * *